(12) United States Patent
Gosch et al.

(10) Patent No.: US 10,732,774 B1
(45) Date of Patent: Aug. 4, 2020

(54) INCREASING CURSOR CONTROL DEVICE SENSITIVITY

(71) Applicant: Rockwell Collins, Inc., Cedar Rapids, IA (US)

(72) Inventors: Clint L. Gosch, Cedar Rapids, IA (US); Alan M. Kuefler, Marion, IA (US); Thomas B. Campbell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/927,720

(22) Filed: Mar. 21, 2018

(51) Int. Cl.
*G06F 3/044* (2006.01)
*G06F 3/041* (2006.01)
*G06F 3/0354* (2013.01)
*B64D 43/00* (2006.01)

(52) U.S. Cl.
CPC .......... *G06F 3/044* (2013.01); *G06F 3/03547* (2013.01); *G06F 3/0416* (2013.01); *B64D 43/00* (2013.01)

(58) Field of Classification Search
CPC ... B64D 43/00; G06F 3/03547; G06F 3/0418; G06F 3/044; G06F 2203/0333; G06F 2203/0334; G06F 2203/0332; G06F 3/0416
See application file for complete search history.

(56) References Cited

U.S. PATENT DOCUMENTS

| | | | | |
|---|---|---|---|---|
| 2009/0027349 A1* | 1/2009 | Comerford | .......... | G06F 1/1626 345/173 |
| 2009/0315641 A1* | 12/2009 | Ding | ............... | H01P 1/184 333/161 |
| 2011/0312349 A1* | 12/2011 | Forutanpour | ......... | G06F 1/1626 455/466 |
| 2012/0326961 A1* | 12/2012 | Bromer | ................. | G06F 3/044 345/156 |
| 2013/0057337 A1* | 3/2013 | Kang | ................. | G06F 3/0418 327/551 |
| 2014/0218329 A1* | 8/2014 | Schmidt | .............. | G06F 3/0416 345/174 |

\* cited by examiner

*Primary Examiner* — Dennis P Joseph
(74) *Attorney, Agent, or Firm* — Suiter Swantz pc llo

(57) ABSTRACT

An aircraft includes a cursor control device having a defined return path for the touch sensor so that the impedance in the return path is known. The defined return path is embodied in a conductive feature in the cursor control device palm contact area to ground the user and improve the system's signal to noise ratio. The defined return path normalizes signal variability due to environmental factors and user specific factors such as finger size, skin moisture, contaminants, etc.

17 Claims, 6 Drawing Sheets

INCREASING CURSOR CONTROL DEVICE SENSITIVITY

BACKGROUND

Cursor control devices (CCD) used in aircraft such as onboard the Boeing 787 utilize a capacitive touch sensitive human interface device. Existing CCDs exhibit erratic behavior and even inoperability under certain circumstances. Variation in skin moisture and operating environment, contaminates, and even user body size can have an effect on how the touch sensor reacts. If the user has very dry skin, the CCD may not react to a touch at all.

A very high impedance in the return path of the touch sensor results in a very small signal amplitude; sometimes only a few millivolts. Variability in the signal amplitude due to environmental and user specific factors result in an unreliable system.

Consequently, it would be advantageous if an apparatus existed that is suitable for removing variability in touch sensor signals due to environmental and user specific factors.

SUMMARY

In one aspect, embodiments of the inventive concepts disclosed herein are directed to a CCD having a defined return path for the touch sensor so that the impedance in the return path is known. The defined return path is embodied in a conductive feature in the CCD palm contact area that grounds the user and improves the system's signal to noise ratio.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
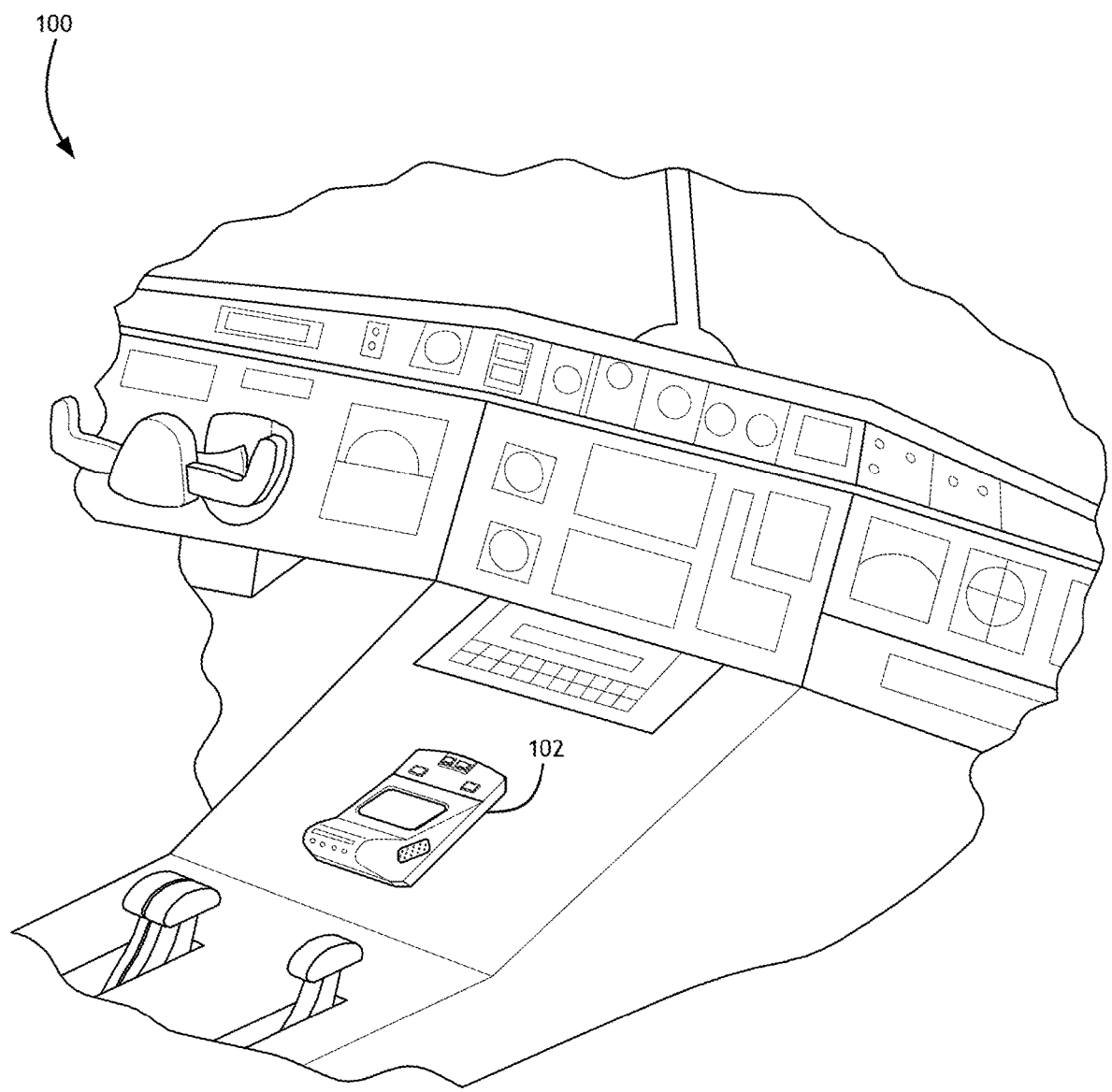
FIG. 1 shows a perspective, environmental view of an exemplary embodiment according to the inventive concepts disclosed herein.
Figure 2:
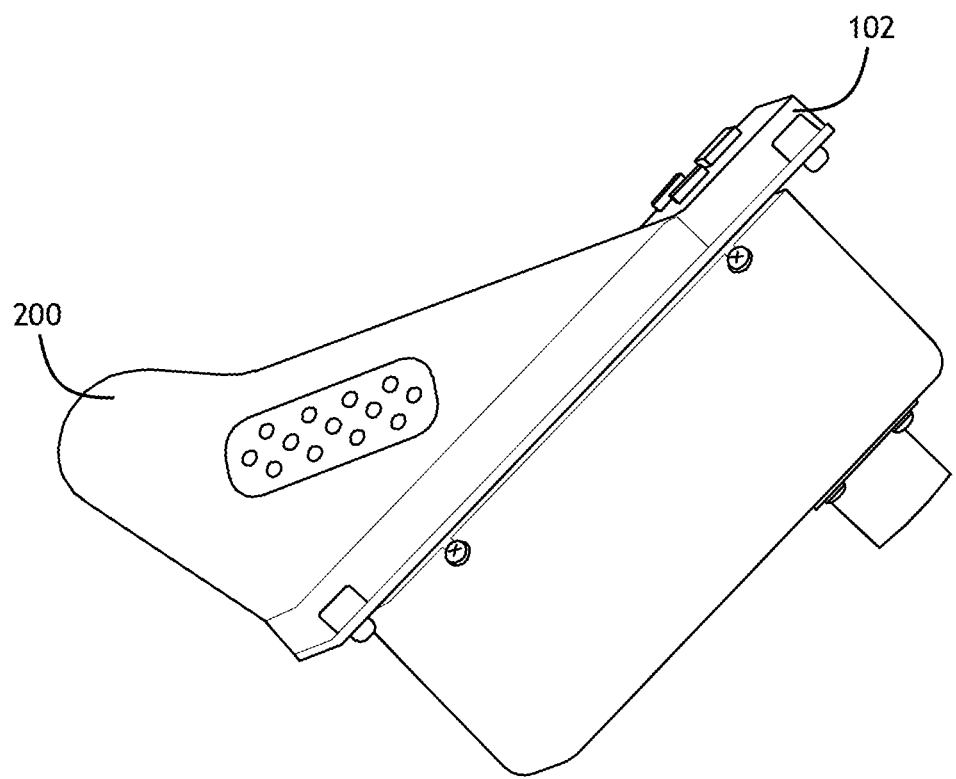
FIG. 2 shows a side view of an exemplary embodiment according to the inventive concepts disclosed herein.
Figure 3:
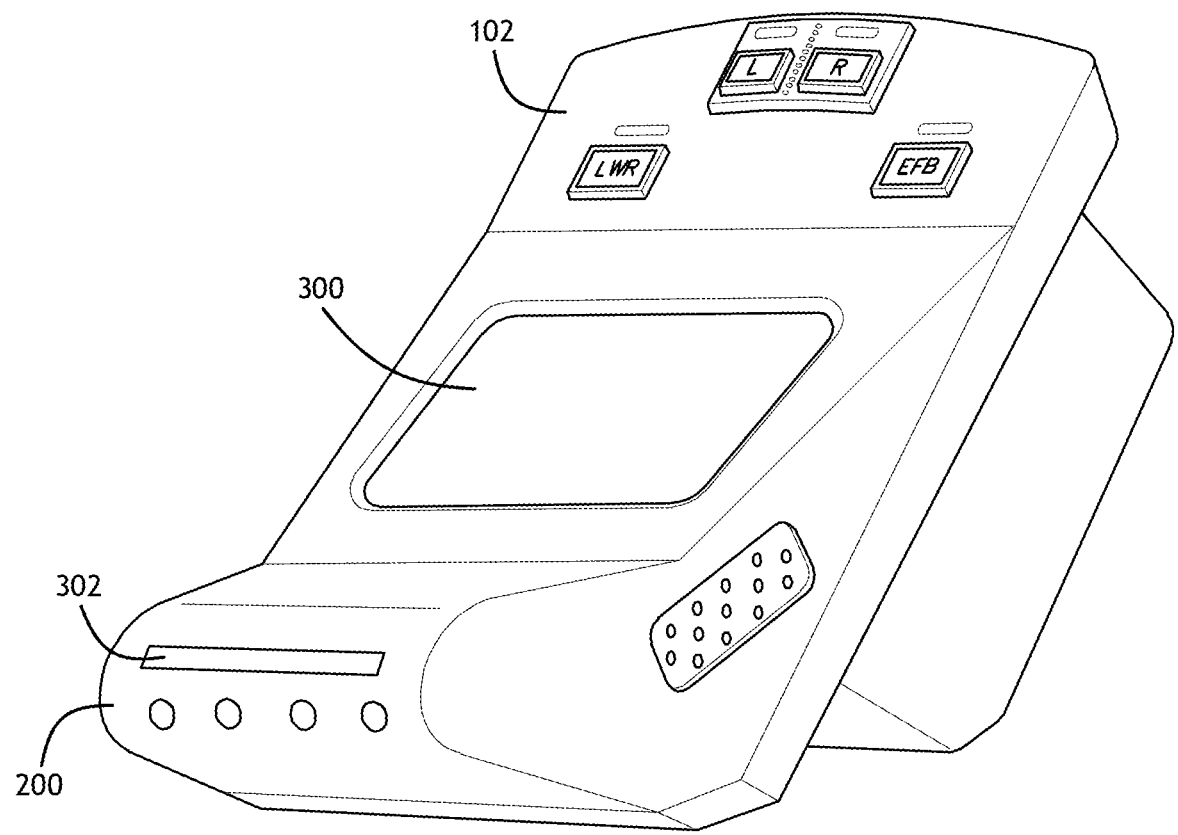
FIG. 3 shows a perspective view of an exemplary embodiment according to the inventive concepts disclosed herein.
Figure 4:
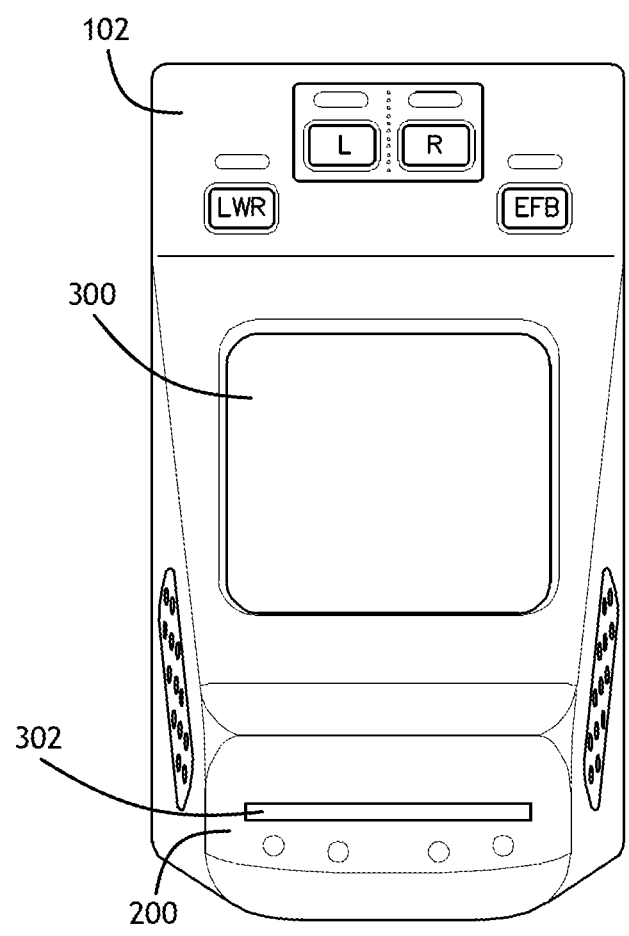
FIG. 4 shows a front view of an exemplary embodiment according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a CCD having a conductive feature on the palm contact area to ground the user's hand, thereby producing a return path with a known impedance.

Referring to FIGS. 1-4, an environmental view, a side view, a perspective view, and a front view of an exemplary embodiment according to the inventive concepts disclosed herein are shown. In at least one embodiment, an aircraft 100 cockpit includes a cursor control device 102. The cursor control device 102 includes a palm rest 200 and a touch sensitive screen 300. In at least one embodiment, the touch sensitive screen 300 includes a capacitive touch sensor.

The touch sensitive screen 300 is sensitive to certain environmental and user specific factors due to the high impedance in the return path of the touch screen circuit, as more fully described herein. In at least one embodiment, a return path contact 302 is disposed in the palm rest 200 of the cursor control device 102.

In at least one embodiment, the return path contact 302 comprises one or more metallic posts embedded in the palm rest 200. Such metallic posts may comprise conductive hemispheres disposed on the palm rest 200. The posts may include threaded shafts to attach the posts to the palm rests 200 and connect to ground inside the cursor control device 102 chassis. A number of these hemispheres would be placed in critical areas on the palm contact area. This approach could allow existing CCD's to be retrofitted by creating a tooling drill plate to locate the holes for the threaded hemispheres.

Alternatively, or in addition, the return path contact 302 comprises a metallic plate affixed to the palm rest 200. The metallic plate may comprise Nickel, Stainless Steel, or other suitable material. Such conductive surface would be a large area for palm contact. Alternatively, the metallic plate may comprise a plurality of metallic strips in various areas of the palm rest 200 where palm contact is most likely. The metallic strips may be a few millimeters wide. Multiple strips spaced 10 millimeters or more may be used. Such metallic strips may protrude slightly above the surface of the palm rest 200 to provide a tactile feel to the user to anchor the user to the cursor control device 102 in rough air.

Alternatively, or in addition, the return path contact 302 comprises a conductive film applied to the palm rest 200. The conductive film may comprise a graphene paint, conductive epoxy, metallic foil, or other conformable coating suitable as a contact in a return path of a circuit; paint or coating color and texture may be selected to minimize sunlight reflectance. In any case, the return path contact 302 is in electronic communication with internal circuitry as more fully described herein.

Alternatively, the entire front plate of the cursor control device 102 may be fabricated using an injection molded conductive plastic.

Figure 5:
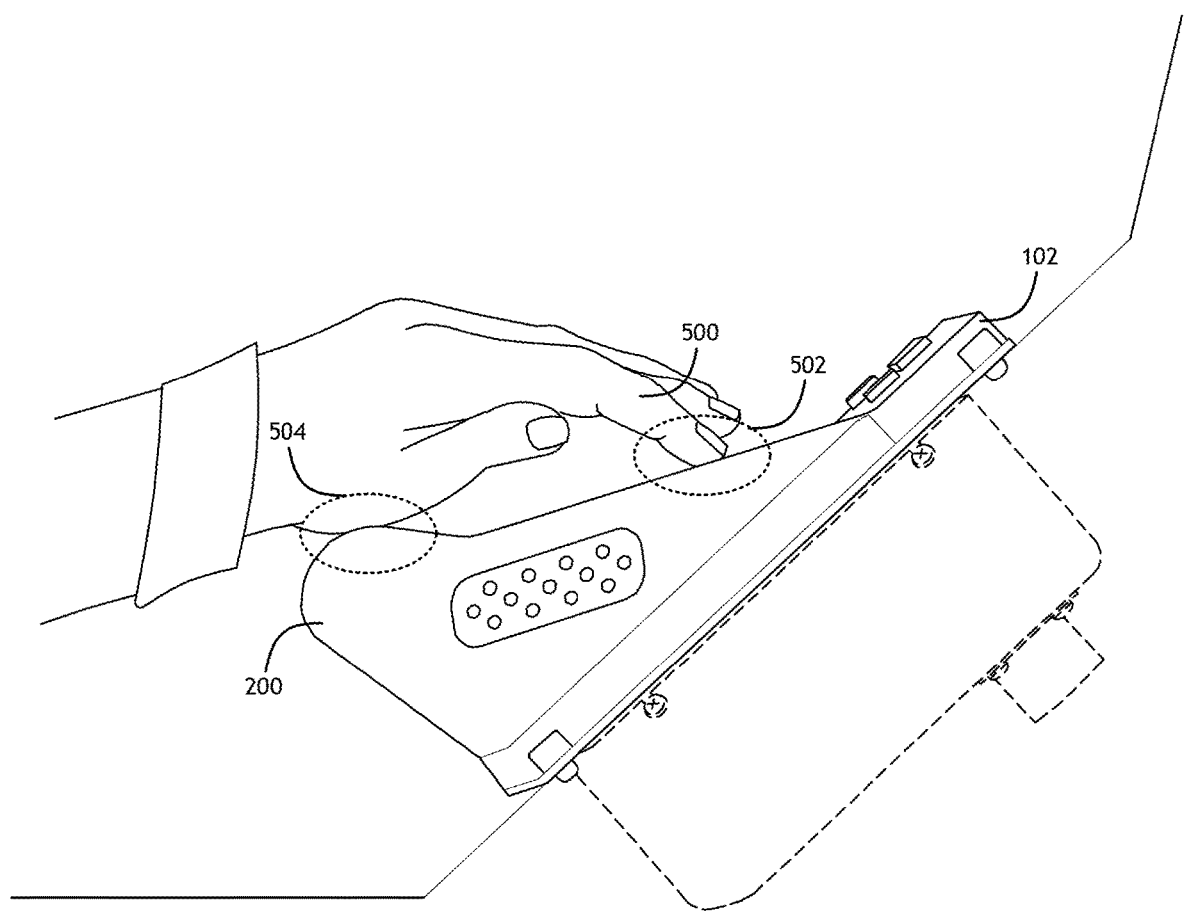
FIG. 5 shows a side, environmental view of an exemplary embodiment according to the inventive concepts disclosed herein.

Referring to FIG. 5, a side, environmental view of an exemplary embodiment according to the inventive concepts disclosed herein is shown. In at least one embodiment, a cursor control device 102 with a return path contact in the palm rest 200 creates a first contact point 502 where the user's finger 500 contacts the touch sensitive screen and a second contact point 504 where some portion of the user's palm contacts the palm rest 200.

Figure 6:
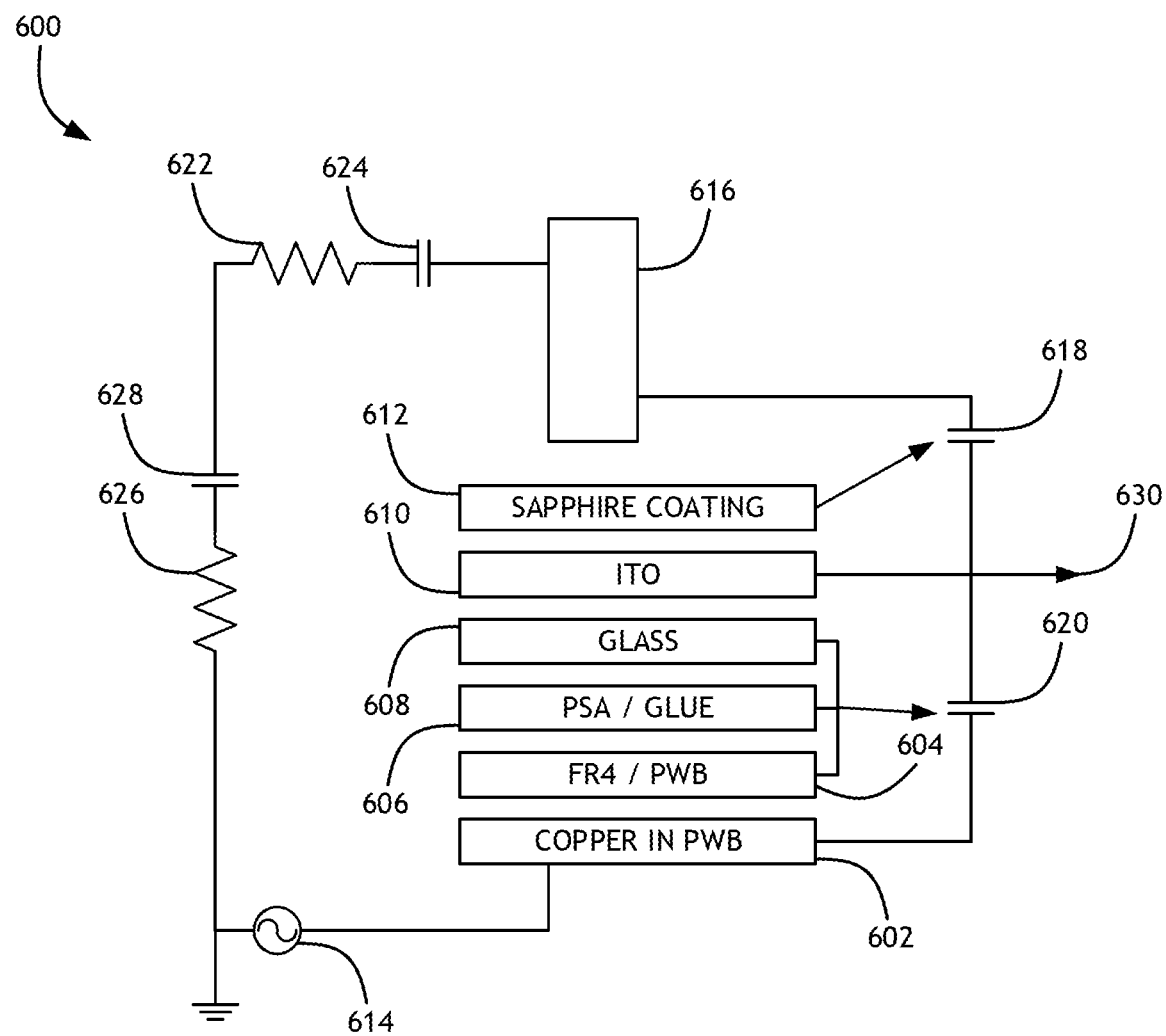
FIG. 6 shows a block diagram of a circuit according to an exemplary embodiment of the inventive concepts disclosed herein.

Referring to FIG. 6, a block diagram of a circuit 600 according to an exemplary embodiment of the inventive concepts disclosed herein is shown. In at least one embodiment, the circuit 600 includes a touch sensitive screen comprising a stack of a printed wiring board 602 with copper contacts, a layer of FR4 material 604, a layer of pressure sensitive adhesive 606, a glass pane 608, a layer of indium tin oxide 610, and a sapphire coating 612.

In at least one embodiment, a signal generator 614 is connected to the printed wiring board 602. The signal generator 614 may be an alternating current source operating at approximately 50 kHz, and with a peak-to-peak voltage of approximately 10 v. Electronically, the user's finger 616 and indium tin oxide 610 layer comprise components of a first capacitor 618 where the sapphire coating 612 comprises an insulating dielectric layer. Likewise, the indium tin oxide 610 layer and copper contacts in the printed wiring board 602 comprise components of a second capacitor 620 where the FR4 material 604, pressure sensitive adhesive 606, and glass pane 608 comprise the insulating dielectric layer.

In at least one embodiment, the electrical characteristics of the user are modeled by a combination of a body resistor 622 and body capacitor 624. Typically, the body resistor 622 is approximately 1 k ohms and the body capacitor 624 is approximately 100 pf. Further, the return path contact is modeled by a return path resistor 626 and return path capacitor 628. The return path resistor 626 is connected to a grounded terminal of the signal generator 614. The return path resistor 626 and return path capacitor 628 define a return path from the user's finger 616 to the signal generator 614 with a known, generally reduced impedance resulting in a more measurable, consistent output signal 630 with improved signal-to-noise ratio.

While the impedance of the return path may be reduced, isolation between the user and ground of up to 20 k ohms may still yield an improvement in cursor control device response.

While the specific embodiments disclosed herein have been directed toward touch sensitive systems in an aircraft, other embodiments may be directed toward non-aircraft implementations such as consumer devices.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A cursor control device comprising:
a capacitive touch screen;
a signal generator connected to the capacitive touch screen; and
a return path contact connected to a ground terminal of the signal generator,
wherein the return path contact comprises a plurality of posts disposed in a palm rest portion, each of the plurality of posts, each comprising a threaded shaft and hemispherical portion, the threaded shaft configured to screw into the palm rest portion and contact a ground, the hemispherical portions protruding from the palm rest portion to contact a portion of a user's hand configured to reduce impedance in a signal path.

2. The cursor control device of claim 1, wherein the return path contact comprises at least one metallic plate embedded in the palm rest portion.

3. The cursor control device of claim 2, wherein the at least one metallic plate protrudes above a surface of the palm rest portion.

4. The cursor control device of claim 1, wherein the return path contact comprises a conductive paint applied to the palm rest portion.

5. The cursor control device of claim 1, wherein the return path contact comprises a conductive front plate.

6. The cursor control device of claim 1, wherein the return path contact produces a return path impedance of less than 20 k ohms.

7. A computer apparatus comprising:
a capacitive touch screen;
a signal generator connected to the capacitive touch screen; and
a return path contact connected to a ground terminal of the signal generator,
wherein the return path contact comprises a plurality of posts disposed in a palm rest portion, each of the plurality of posts, each comprising a threaded shaft and hemispherical portion, the threaded shaft configured to screw into the palm rest portion and contact a ground, the hemispherical portions protruding from the palm rest portion to contact a portion of a user's hand configured to reduce impedance in a signal path.

8. The computer apparatus of claim 7, wherein the return path contact comprises at least one metallic plate embedded in the palm rest portion.

9. The computer apparatus of claim 8, wherein the at least one metallic plate protrudes above a surface of the palm rest portion.

10. The computer apparatus of claim 7, wherein the return path contact comprises a conductive paint applied to the palm rest portion.

11. The computer apparatus of claim 7, wherein the return path contact produces a return path impedance of less than 20 k ohms.

12. An aircraft comprising:
a cursor control device comprising:
a capacitive touch screen;
a signal generator connected to the capacitive touch screen; and
a return path contact connected to a ground terminal of the signal generator,
wherein the return path contact comprises a plurality of posts disposed in a palm rest portion, each of the plurality of posts, each comprising a threaded shaft and hemispherical portion, the threaded shaft configured to screw into the palm rest portion and contact a ground, the hemispherical portions protruding from the palm rest portion to contact a portion of a user's hand to reduce impedance in a signal path at the capacitive touch screen.

13. The aircraft of claim 12, wherein the return path contact comprises at least one metallic plate embedded in the palm rest portion.

14. The aircraft of claim 13, wherein the at least one metallic plate protrudes above a surface of the palm rest portion.

15. The aircraft of claim 12, wherein the return path contact comprises a conductive paint applied to the palm rest portion.

16. The aircraft of claim 12, wherein the return path contact comprises a conductive front plate.

17. The aircraft of claim 12, wherein the return path contact produces a return path impedance of less than 20 k ohms.

* * * * *